(12) United States Patent
Madurawe

(10) Patent No.: US 10,708,529 B2
(45) Date of Patent: Jul. 7, 2020

(54) IMAGE SENSORS WITH LOW-VOLTAGE TRANSISTORS

(71) Applicant: SEMICONDUCTOR COMPONENTS INDUSTRIES, LLC, Phoenix, AZ (US)

(72) Inventor: Raminda Madurawe, Sunnyvale, CA (US)

(73) Assignee: SEMICONDUCTOR COMPONENTS INDUSTRIES, LLC, Pheonix, AZ (US)

( * ) Notice: Subject to any disclaimer, the term of this patent is extended or adjusted under 35 U.S.C. 154(b) by 219 days.

(21) Appl. No.: 15/848,160

(22) Filed: Dec. 20, 2017

(65) Prior Publication Data

US 2019/0191116 A1    Jun. 20, 2019

(51) Int. Cl.
| | |
|---|---|
| *H04N 5/225* | (2006.01) |
| *H04N 5/369* | (2011.01) |
| *H04N 5/378* | (2011.01) |
| *H04N 5/3745* | (2011.01) |
| *H04N 5/374* | (2011.01) |

(52) U.S. Cl.
CPC .......... *H04N 5/3698* (2013.01); *H04N 5/378* (2013.01); *H04N 5/3741* (2013.01); *H04N 5/37455* (2013.01)

(58) Field of Classification Search
CPC .......... H04N 5/374–37457; H04N 5/335–378; H04N 5/3355; H04N 5/3745; H04N 5/37455; H01L 27/14643–14663; H01L 27/146–14893; H03M 1/00–645
See application file for complete search history.

(56) References Cited

U.S. PATENT DOCUMENTS

| | | | |
|---|---|---|---|
| 9,000,966 B2 * | 4/2015 | Sohn | H04N 5/378 341/155 |
| 2003/0080276 A1 | 5/2003 | Brown et al. | |
| 2003/0122533 A1 | 7/2003 | Prescott | |
| 2004/0085466 A1 | 5/2004 | Herold | |
| 2004/0150454 A1 | 8/2004 | Bhattacharya et al. | |
| 2005/0069321 A1 | 3/2005 | Sullivan | |

(Continued)

FOREIGN PATENT DOCUMENTS

CN                105811765            7/2016

*Primary Examiner* — Sinh Tran
*Assistant Examiner* — Selam T Gebriel
(74) *Attorney, Agent, or Firm* — Treyz Law Group, P.C.; Tianyi He

(57) ABSTRACT

An image sensor may include an array of pixels, and analog and digital circuitry. The pixels in the array may generate image signals in response to incident light. The image sensor may also include power supply circuitry and corresponding voltage rail structures that provide voltage levels to operate the pixel array, the analog circuitry, and the digital circuitry. The power supply circuitry may provide a low voltage, a high voltage, and an intermediate voltage power rail. The analog circuitry may operate in a voltage level domain defined by voltages between an intermediate voltage level and a high voltage level. The digital circuitry may operate in a voltage level domain defined by voltages between a low voltage level and the intermediate voltage level. In such a configured, analog and digital circuitry may both be provided with low-voltage transistors that are more area and power efficient and that are more scalable.

19 Claims, 8 Drawing Sheets

(56) References Cited

U.S. PATENT DOCUMENTS

| | | |
|---|---|---|
| 2005/0104983 A1 | 3/2005 | Raynor |
| 2005/0205759 A1 | 9/2005 | Wang et al. |
| 2007/0211156 A1 | 9/2007 | Tay |
| 2008/0055802 A1 | 3/2008 | Wu et al. |
| 2008/0159755 A1 | 7/2008 | Hakomori |
| 2008/0297487 A1 | 12/2008 | Hotelling et al. |
| 2010/0140732 A1 | 6/2010 | Eminoglu et al. |
| 2010/0157098 A1 | 6/2010 | Altice et al. |
| 2010/0194617 A1 | 8/2010 | Oku |
| 2010/0238598 A1 | 9/2010 | Liang et al. |
| 2010/0238599 A1 | 9/2010 | Liang et al. |
| 2010/0244115 A1 | 9/2010 | Kurjanowicz et al. |
| 2010/0245809 A1 | 9/2010 | Andreou et al. |
| 2012/0244290 A1 | 9/2012 | Mullin et al. |
| 2012/0312967 A1 | 12/2012 | Wit et al. |
| 2013/0285581 A1 | 10/2013 | Meyer et al. |
| 2015/0063417 A1 | 3/2015 | Jeong et al. |
| 2015/0189197 A1 | 7/2015 | Guo et al. |
| 2015/0215559 A1 | 7/2015 | Tubert |
| 2016/0277012 A1 | 9/2016 | Abesingha et al. |
| 2016/0286150 A1* | 9/2016 | Sukegawa .......... H04N 5/37455 |
| 2017/0068118 A1 | 3/2017 | Schweickert et al. |

* cited by examiner

IMAGE SENSORS WITH LOW-VOLTAGE TRANSISTORS

BACKGROUND

This relates generally to imaging devices, and more particularly, to imaging devices having low-voltage transistors.

Image sensors are commonly used in electronic devices such as cellular telephones, cameras, and computers to capture images. In a typical arrangement, an electronic device is provided with an array of image pixels arranged in pixel rows and pixel columns. Circuitry is commonly coupled to each pixel column for reading out analog image signals from the image pixels. Power sources (e.g., voltage sources) are used to provide a power supply voltage to image pixels to drive the circuitry.

The driven circuitry may include transistors that form analog circuits and digital circuits. Transistors in the analog circuits coupled directly to the pixel array should therefore be tolerant of high voltages (i.e., should handle the maximum image pixel voltage), thereby requiring transistors with high gate, drain and source voltage tolerances. These transistors cost more die area and have lower scalability because of its need to handle high voltages from 0V to the maximum image pixel voltage, which is not scalable. In mixed-signal applications, using the most advance process technology for digital circuitry is not economical due to analog circuitry limitations.

It would therefore be desirable to be able to provide imaging devices with low-voltage transistors for analog circuits.

DETAILED DESCRIPTION

Embodiments of the present invention relate to electronic devices and image sensors having low-voltage transistors. Electronic devices such as digital cameras, computers, cellular telephones, and other electronic devices may include image sensors that gather incoming light to capture an image. The image sensors may include arrays of image pixels. The pixels in the image sensors may include photosensitive elements such as photodiodes that convert the incoming light into image signals. Image sensors may have any number of pixels (e.g., hundreds or thousands or more). A typical image sensor may, for example, have hundreds of thousands or millions of pixels (e.g., megapixels). Image sensors may include control circuitry such as circuitry for operating the image pixels and readout circuitry for reading out image signals corresponding to the electric charge generated by the photosensitive elements.

Figure 1:
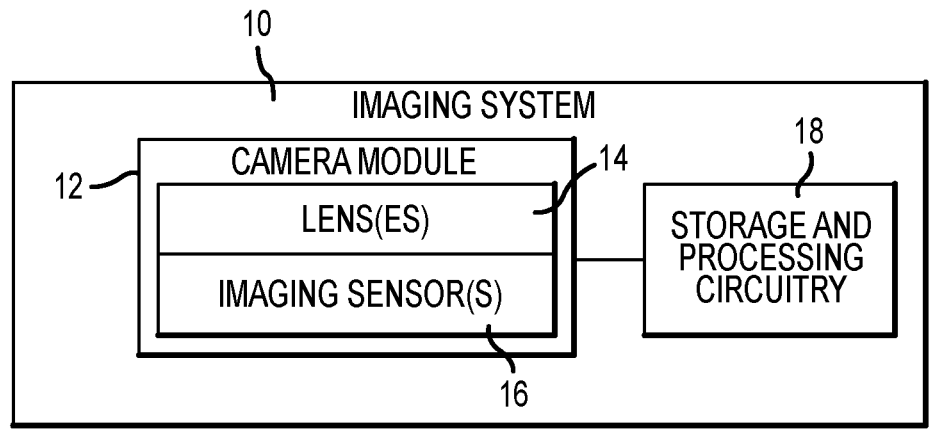
FIG. 1 is a diagram of an illustrative electronic device having an image sensor and processing circuitry for capturing images using an array of image pixels in accordance with an embodiment.

FIG. 1 is a diagram of an illustrative imaging system such as an electronic device that uses an image sensor to capture images. Electronic device 10 of FIG. 1 may be a portable electronic device such as a camera, a cellular telephone, a tablet computer, a webcam, a video camera, a video surveillance system, an automotive imaging system, a video gaming system with imaging capabilities, or any other desired imaging system or device that captures digital image data. Camera module 12 may be used to convert incoming light into digital image data. Camera module 12 may include one or more lenses 14 and one or more corresponding image sensors 16. Lenses 14 may include fixed and/or adjustable lenses and may include microlenses formed on an imaging surface of image sensor 16. During image capture operations, light from a scene may be focused onto image sensor 16 by lenses 14. Image sensor 16 may include circuitry for converting analog pixel data into corresponding digital image data to be provided to storage and processing circuitry 18. If desired, camera module 12 may be provided with an array of lenses 14 and an array of corresponding image sensors 16.

Storage and processing circuitry 18 may include one or more integrated circuits (e.g., image processing circuits, microprocessors, storage devices such as random-access memory and non-volatile memory, etc.) and may be implemented using components that are separate from camera module 12 and/or that form part of camera module 12 (e.g., circuits that form part of an integrated circuit that includes image sensors 16 or an integrated circuit within module 12 that is associated with image sensors 16). Image data that has been captured by camera module 12 may be processed and stored using processing circuitry 18 (e.g., using an image processing engine on processing circuitry 18, using an imaging mode selection engine on processing circuitry 18, etc.). Processed image data may, if desired, be provided to external equipment (e.g., a computer, external display, or other device) using wired and/or wireless communications paths coupled to processing circuitry 18.

Processing circuitry 18 may be used to perform image processing functions such as automatic focusing functions, depth sensing, data forming, adjusting white balance and exposure, implementing video image stabilization, face detection, etc. If desired, image sensor 16 and integrated circuitry 18 may be implemented on a common integrated circuit. The use of a single integrated circuit to implement image sensor 16 and processing circuitry 18 can help to reduce costs. If desired, image sensor 16 and processing circuitry 18 may be implemented using separate integrated circuits.

Figure 2:
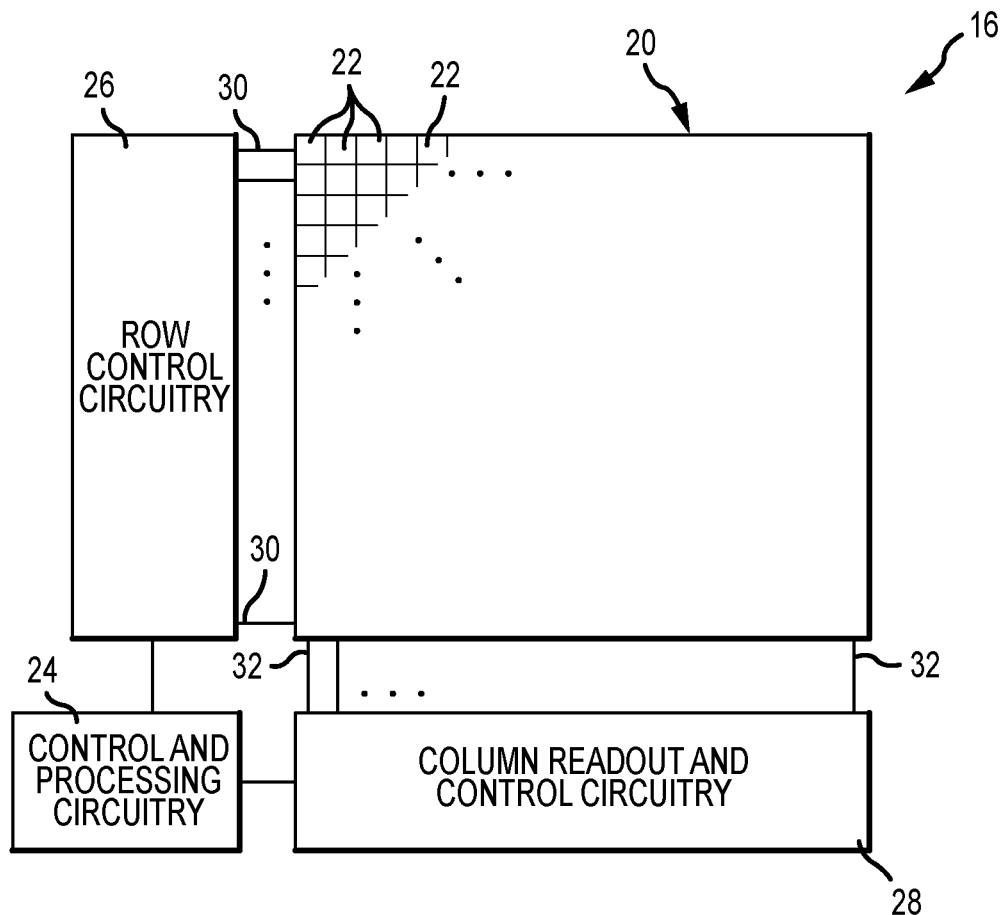
FIG. 2 is a diagram of an illustrative pixel array coupled to analog circuitry and digital circuitry in accordance with an embodiment.

As shown in FIG. 2, image sensor 16 may include a pixel array 20 having image sensor pixels 22 (sometimes referred to herein as image pixels or pixels) arranged in rows and columns. Array 20 may include, for example, hundreds or thousands of rows and columns of image sensor pixels 22. Image pixels 22 may include one or more photosensitive regions for generating charge in response to image light. Photosensitive regions within image pixels 22 may be arranged in rows and columns on array 20. Pixel array 20 may be provided with a color filter array having multiple color filter elements which allows a single image sensor to sample light of different colors. As an example, image sensor pixels such as the image pixels in array 20 may be provided with a color filter array which allows a single image sensor to sample red, green, and blue (RGB) light using corresponding red, green, and blue image sensor pixels arranged in a Bayer mosaic pattern. The Bayer mosaic pattern consists of a repeating unit cell of two-by-two image pixels, with two green image pixels diagonally opposite one another and adjacent to a red image pixel diagonally opposite to a blue image pixel. In another suitable example, the green pixels in a Bayer pattern are replaced by broadband image pixels having broadband color filter elements (e.g., clear color filter elements, yellow color filter elements, etc.). These examples are merely illustrative and, in general, color filter elements of any desired color and in any desired pattern may be formed over any desired number of image pixels 22.

Additionally, array 20 may include optically dark pixels (e.g., black pixels) that do not collect image signals from incident light. Dark pixels may be shielding from incident light using a shielding structure. Any suitable shielding structure may be used to prevent incident light form reaching photosensitive regions of the dark pixels. Alternatively, photosensitive region on dark pixels may be disabled using any desired method to make dark pixels insensitive to incident light. Dark pixels may be used for digital correction and/or as a physical guard band surrounding active pixels. Alternatively, dark pixels may be formed in any desired pattern.

Image sensor 16 may also include control and processing circuitry 24. Control circuitry 24 may be coupled to row control circuitry 26 and image readout circuitry 28 (sometimes referred to as column control circuitry, readout circuitry, processing circuitry, or column decoder circuitry). Row control circuitry 26 may receive row addresses from control circuitry 24 and supply corresponding row control signals such as reset, row-select, charge transfer, dual conversion gain, and readout control signals to pixels 22 over row control paths 30. Row control circuitry 26 may include timing generation circuitry, booster circuitry, row driver circuitry, bias circuitry, and other suitable circuitry that enable row control circuitry 26 to generate suitable row control signals at corresponding high and low voltages. If desired, the bias circuitry and the timing generation circuitry may be included within control and processing circuitry 24 because the bias circuitry and the timing generation circuitry communicate with both row-wise circuitry (e.g., the booster circuitry and the row driver circuitry) and column-wise circuitry (e.g., ADC circuitry in readout circuitry 28). The timing generation circuitry may be coupled to readout circuitry 28 to generate timing control signals for operating image pixels 22 (e.g. timing control signals during image signal readout). The timing generation circuitry may also be coupled to the row driver circuitry for relaying various control signals (e.g., source follower transistor control signal, transfer transistor control signal, etc.) according to a timing schedule of desired operations.

One or more conductive lines such as column lines 32 may be coupled to each column of pixels 22 in array 20. Column lines 32 may be used for reading out image signals from pixels 22 and for supplying bias signals (e.g., bias currents or bias voltages) to pixels 22. If desired, during pixel readout operations, a pixel row in array 20 may be selected using row control circuitry 26 and image signals generated by image pixels 22 in that pixel row can be read out along column lines 32.

Image readout circuitry 28 may receive image signals (e.g., analog pixel values generated by pixels 22) over column lines 32. Image readout circuitry 28 may include sample-and-hold circuitry for sampling and temporarily storing image signals read out from array 20, amplifier circuitry, analog-to-digital converter (ADC) circuitry such as circuitry 34, bias circuitry, column memory, latch circuitry for selectively enabling or disabling the column circuitry, or other circuitry that is coupled to one or more columns of pixels in array 20 for operating pixels 22 and for reading out image signals from pixels 22. ADC circuitry 34 in readout circuitry 28 may convert analog pixel values received from array 20 into corresponding digital pixel values (sometimes referred to as digital image data or digital pixel data). Circuitry downstream of ADC circuitry 34 may further process the digital pixel data. Image readout circuitry 28 may supply digital pixel data to control and processing circuitry 24 and/or processors 18 (FIG. 1) for pixels in one or more pixel columns. For example, digital correlated double sampling processing may take place downstream of ADC circuitry 34. This is merely illustrative, if desired, other processing operations may occur downstream or upstream from ADC circuitry 34.

Image sensor 16 of FIG. 2 is merely illustrative. Some features within image sensor 16 (FIG. 1) are omitted in FIG. 2 for the sake of clarity. If desired, additional features may also be included within image sensor 16 to provide addition functionalities.

As described in connection with FIG. 2, analog circuitry (e.g., in column readout circuitry 28) may read out analog pixel signals generated by array 20, conversion circuitry (e.g., in column readout circuitry 28) may convert the analog pixel signals to digital pixel data, and digital processing circuitry (e.g., in control and processing circuitry 24) may perform processing on the digital pixel data (e.g., in the digital domain). The analog circuitry may directly receive analog pixel signal from array 20 (e.g., an output line 32 of a pixel may have a direct connection to the analog circuitry). Circuitry in the analog circuitry should therefore be configured to handle high voltage signals from the pixel (e.g., to handle a maximum pixel voltage (i.e., a high voltage level), which is a sum of a pinning voltage of a pinned photodiode of the pixel and a voltage stored as a signal in a floating diffusion region of the pixel).

Figure 3:
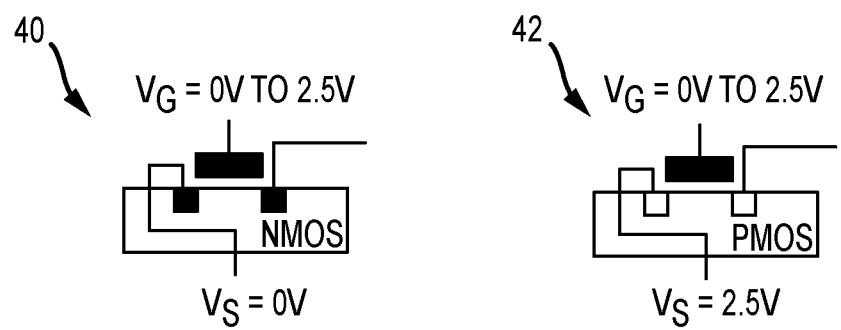
FIG. 3 is a diagram of illustrative transistors in accordance with an embodiment.

As an example, if the maximum pixel voltage carried by line 32 is 2.5 V, transistors in the analog circuitry should be configured to operate in a 2.5 V voltage environment (e.g., configured to receive a 2.5 V voltage at a gate terminal or a source-drain terminal of any given transistor). FIG. 3A shows a pair of illustrative complementary metal-oxide-semiconductor (CMOS) transistors (e.g., n-channel MOS (NMOS) transistor 40 and p-channel MOS (PMOS) transistor 42) that may be used in the analog circuitry. NMOS transistor 40 may have a gate region, a body region, a first source-drain region, and a second source-drain, each of which may be biased or supplied with a given voltage at a respective terminal. The gate terminal of transistor 40 may be supplied with a voltage between 0 V and 2.5 V (e.g., a gate voltage $V_G$), while the first source-drain terminal (e.g., a source terminal) and the body (e.g., substrate, well) terminal are biased to 0 V. The second source-drain terminal of transistor 40 may be supplied with a desirable voltage to operate transistor 40 (e.g., when transistor 40 is activated, when gate voltage $V_G$ is greater than a threshold voltage, etc.). PMOS transistor 42 may also include a gate region, a body region, a first source-drain region, and a second source-drain region, each of which may be biased or supplied with a given voltage a respective terminal. The gate terminal of transistor 42 may be supplied with a voltage between 0 V and 2.5 V, while the first source-drain terminal (e.g., a source terminal) and the body terminal of transistor 42 are biased to 2.5 V. The second source-drain terminal of transistor 42 may be supplied with a desirable voltage to operate transistor 42.

However, in order for transistors such as transistors 40 and 42 in the analog circuitry to have breakdown voltage parameters tolerant of the applied gate voltage (e.g., appropriate gate oxide breakdown down voltage, gate oxide thickness) and the applied source and drain voltage (e.g., appropriate transistor channel lengths, junction break-down voltage), transistors 40 and 42 will have high area costs and high power consumption costs. For example, in comparison, the digital circuitry may have transistors configured to handle 1.2 V voltage levels, whereas the analog circuitry may have transistors configured to handle 2.5 V voltage levels, which require much larger transistors with thicker gate oxide thickness. Additionally, in such a scenario, the analog circuitry and the digital circuitry requires different sized transistors further adding fabrication complexity and fabrication costs. As transistors scale to smaller and smaller sizes, these issues for a high-voltage transistor (e.g., a 2.5 V transistor) are amplified. Therefore, it may be desirable to provide low-voltage transistors of the same size to analog circuitry and digital circuitry in an image sensor.

Figure 4:
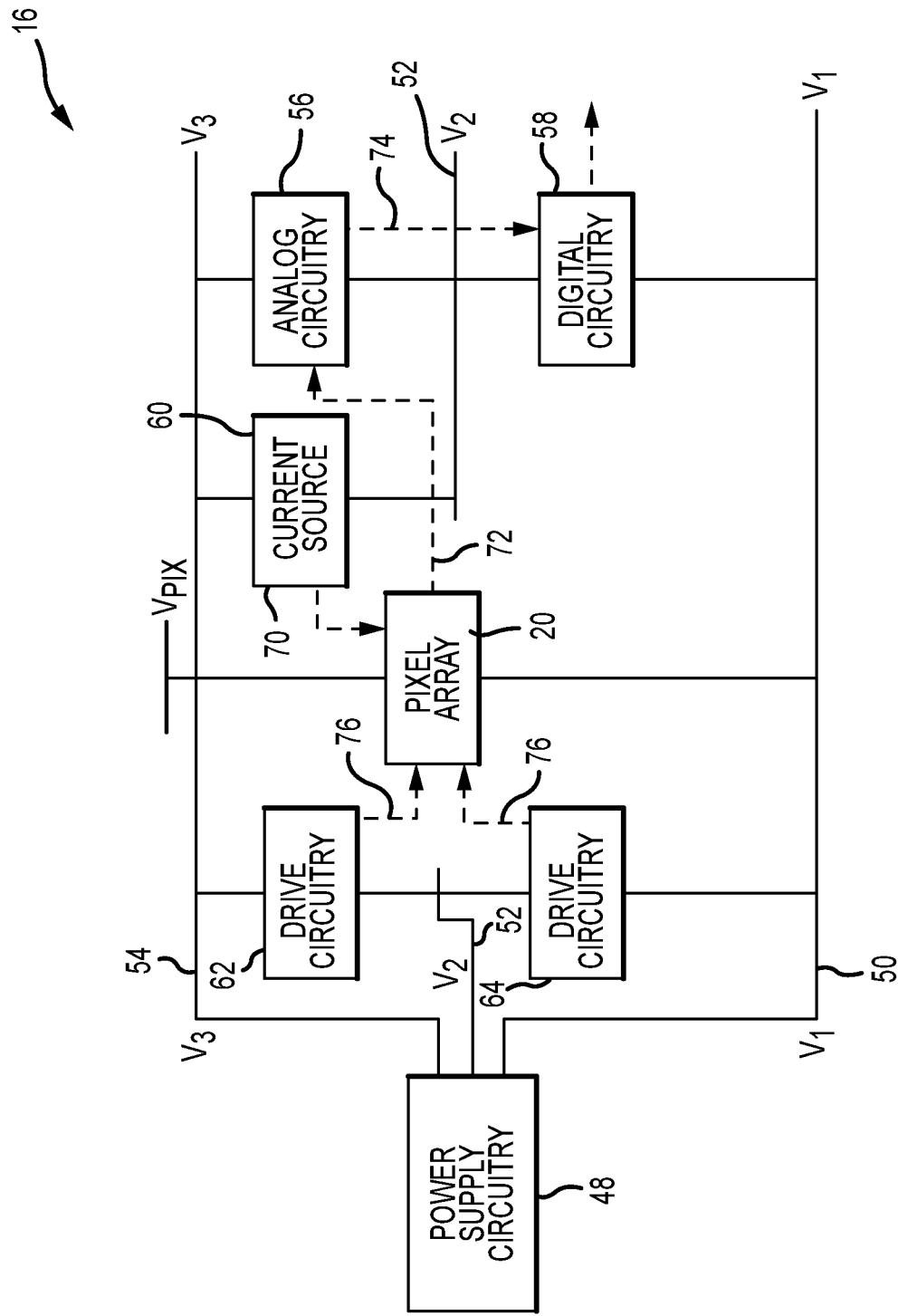
FIG. 4 is a block diagram of an illustrative image sensor having circuitry using voltages provided by high, low, and intermediate voltage rails in accordance with an embodiment.

FIG. 4 shows an illustrative power supply scheme or architecture that is facilitates the use of low-voltage transistors in analog and digital circuitry in an image sensor. As shown in FIG. 4, image sensor 16 may include power supply circuitry 48 that supplies power supply line 50 (sometimes referred to herein as a power supply rail or voltage supply rail), which provides voltage level $V_1$ to circuitry within image sensor 16, power supply line 52, which provides voltage level $V_2$ to circuitry within image sensor 16, and power supply line 54, which provides voltage level $V_3$ to circuitry within image sensor 16. As an example, voltage level $V_1$ may be at a lower voltage than voltage level $V_2$, which is at a lower voltage level than voltage level $V_3$. In this configuration, power supply line 50 may be referred to as a low-power rail that provides a low voltage level (e.g., a ground voltage), power supply line 54 may be referred to as a high-power rail that provides a high voltage level (e.g., an analog supply voltage, a maximum voltage of an analog pixel signal, etc.), power supply line 52 may be referred to as an intermediate power rail that provides an intermediate voltage level between the low and high voltage levels. For example, the intermediate voltage level may be an average of the low and high voltage levels. If desired, the intermediate voltage level may be any desirable voltage level between the low and high voltage levels.

Image sensor 16 may include analog circuitry 56 and digital circuitry 58. Analog circuitry 56 may include sample and hold circuitry, comparator circuitry, amplifier circuitry, conversion circuitry (e.g., analog-to-digital (ADC) circuitry), etc. As an example, column circuitry 28 in FIG. 2 may include portions of analog circuitry 56. If desired, portions of analog circuitry 56 may be formed outside of column circuitry 28 (e.g., in processing circuitry 24 in FIG. 2 for analog processing operations, in row circuitry 26 in FIG. 2, etc.). Analog circuitry 56 may include transistors and other circuits that receive power supply voltages and operating within a range of voltages between a high voltage level and a low voltage level (sometimes referred to herein as a reference voltage level). As shown in FIG. 4, analog circuitry 56 may receive voltage level $V_2$ as a reference supply voltage level, and voltage level $V_3$ as a high supply voltage level. As such, circuitry within analog circuitry 56 may operate within a range of voltage between voltage levels $V_2$ and $V_3$. In particular, transistor circuits in analog circuitry 56 may operate with a maximum voltage swing (i.e., difference) of $V_2$ subtracted from $V_3$.

Digital circuitry 58 may include digital processing circuitry, digital control circuitry, storage circuitry, etc. As an example, control and processing circuitry 24 in FIG. 2 may include portions of digital circuitry 58. If desired, portions of digital circuitry 58 may be formed outside of control circuitry 24 (e.g., in column circuitry 28, row control circuitry 26, etc.). Digital circuitry 58 may include transistors and other circuitry that receive power supply voltages and operating within a range of voltages between a high voltage level and a low voltage level. Digital circuitry 58 may receive voltage level $V_1$ as a reference supply voltage level, and voltage level $V_2$ as a high supply voltage level. As such, circuitry within digital circuitry 58 may operate within a range of voltage between voltage levels $V_1$ and $V_2$. In particular, transistor circuits in digital circuitry 58 may operate with a maximum voltage swing of $V_1$ subtracted from $V_2$.

Image sensor 16 may further include pixel array 20 that is supplied with pixel voltage $V_{PIX}$ and a reference voltage $V_1$. As such, image pixels within pixel array 20 may generate analog pixel signals having voltage levels between pixel voltage level $V_{PIX}$ and $V_1$. If desired, $V_{PIX}$ may be the same voltage level as $V_3$, thereby simplifying the power supply scheme. Since voltage level $V_{PIX}$ may be substantially similar to voltage level $V_3$, both signals may be referred to sometimes herein as a high voltage level and treated as the same voltage level for simplicity. Image sensor 16 may include current source 60 that provides pixel columns within array 20 with an induced current on the output line of each respective column in array 20. Current source 60 provides the induced current (via path 70) to drive analog pixel signals off of a corresponding pixel in the column and onto analog circuitry 56 (via path 72). Current source 60 may be supplied with voltage levels $V_3$ and $V_2$ to properly direct analog pixel signals from the corresponding pixel to analog circuitry 56 (e.g., readout circuitry 28).

Additionally, image sensor 16 may also include driver circuitry 62 and 64. As an example, row control circuitry 26 in FIG. 2 may include high voltage driver circuitry (e.g., circuitry 62) and low voltage driver circuitry (e.g., circuitry 64). Drive circuitry 62 may include high voltage driver circuits, and power supply circuitry 48 may provide voltage levels $V_2$ and $V_3$ to drive circuitry 62. Drive circuitry 64 may include low voltage driver circuits, and power supply circuitry 48 may provide voltage levels $V_1$ and $V_2$ to drive circuitry 64. Drive circuitry 62 may provide high voltage signals to pixel array 20 via path 76. Drive circuitry 64 may similarly provide low voltage signals to pixel array 20 via path 76.

By using the power supply scheme provided in FIG. 4, analog circuitry 56 may be configured to operate while receiving voltages between voltage level $V_2$ and $V_3$. In other words, circuitry (e.g., transistors) within analog circuitry 56 may operate with a maximum voltage swing from voltage level $V_2$ to voltage level $V_3$. For example, a transistor that supports a voltage difference of $V_3$ and $V_2$ may be used in analog circuitry 56 instead of a transistor that would have to support a voltage difference of $V_3$ and 0V (i.e., a grounding voltage). Transistors in digital circuitry 58 may be configured to operate while receiving voltages between voltage level $V_2$ and $V_1$. By decreasing the applied relative gate voltage and the applied relative source and drain voltages (e.g., relative to body bias voltage), the transistors may be fabricated with thinner gate oxides and smaller transistor channel lengths.

As an example, triple well isolation may be used to form (e.g., deep well isolation) different substrate regions, which can be respectively biased to different voltage levels (e.g., voltage levels $V_1$, $V_2$, and/or $V_3$). If desired, voltage level $V_1$ may be at a ground voltage (e.g., 0V), and voltage level $V_3$ may be at 2.5V. Voltage level $V_2$ may be at an intermediate voltage (e.g., a voltage level between voltage levels $V_1$ and $V_3$, a voltage level between 0V and 2.5V, 1.0V, 1.25V, etc.). In particular, voltage level $V_2$ may be selected based on a resolution setting of a pixel (e.g., image signal resolution). As an example, when reading out a 10-bit resolution signal, the image signal voltage swing on an output line of the pixel may be 0.9V. Voltage level $V_2$ may therefore be selected to ensure that the analog readout circuitry (e.g., circuitry 56) may register the maximum voltage swing of 0.9V. In such a scenario, the voltage level difference between voltage levels $V_2$ and $V_3$ may be greater than 0.9V (e.g., voltage level $V_3$ may be at 2.5V and voltage level $V_2$ may be at 1.25V). As another example, when reading out a 12-bit resolution signal, the image signal swing on the output line of the pixel may be 1.1V. Voltage level $V_2$ may therefore be selected to ensure that the analog readout circuitry may register the maximum voltage swing of 1.1V. In such a scenario, the voltage level difference between voltage levels $V_2$ and $V_3$ may be greater than 1.1V (e.g., voltage level $V_3$ may be at 2.5V and voltage level $V_2$ may be at 1.0V). These examples are merely illustrative. If desired, voltage levels $V_1$, $V_2$, and $V_3$ may provide any suitable voltage to circuitry within image sensor 16.

As an additional benefit, when voltage level $V_2$ is selected to be an average of the voltages provided by power rails 50 and 54, analog circuitry 56 and digital circuitry 58 may include the same type (e.g., size) of transistors. These transistors may be fabricated simultaneously without relying on fabrication technology used to form transistors of two different types or sizes, thereby simplifying the fabrication process. Pixels generate a low (difference or swing) voltage signal at high voltage levels (e.g., at voltage levels of 1.4V-2.3V or between voltage levels $V_2$ and $V_3$). Analog circuitry 56 makes use of this by implementing low voltage transistor within analog circuitry 56 that are configured to operate at these high voltage levels.

Similarly, current source 60, drive circuitry 62, and drive circuitry 64 may be coupled to their respective upper and lower power rails (e.g., two (voltage) adjacent power rails of power rails 50, 52, and 54). Image sensor 16 may include additional circuitry that receives power from power supply circuitry 48 via power rails 50, 52, and/or 54. The circuitry shown in FIG. 4 is merely illustrative. If desired, any additional circuitry may be included within image sensor 16 and be coupled to one or more of power rails 50, 52, and 54.

As shown in FIG. 4, pixel array 20 (e.g., each active pixel in pixel array 20 may be coupled a powers supply terminal (e.g., a power supply rail) that provide voltage level $V_{PIX}$ and an additional terminal that provides voltage level $V_1$ (e.g., a grounding terminal). As an example, power supply circuitry 48 may provide a pixel voltage (e.g., voltage $V_{PIX}$) to a source-drain terminal of a floating diffusion reset transistor to reset the floating diffusion region to a reset voltage level (e.g., voltage level $V_{PIX}$) and/or a source follower transistor to amplify a signal stored at a floating diffusion of a given pixel and provide the amplified signal to an output line of the given pixel. As such, it may be desirable to keep the voltage level $V_{PIX}$ at a high voltage level (e.g., a 2.8V voltage level, when voltage level $V_3$ may be at 2.5V). However, if desired, voltage level $V_{PIX}$ may be the same as voltage level $V_3$. In other words, an additional voltage rail may be omitted as pixel array 20 may be coupled to voltage rail 54 instead of a voltage rail supplying voltage level $V_{PIX}$.

FIG. 4 also depicts an illustrative signal readout path from pixel array 20 (e.g., via path 72). In particular, path 72 may include multiple output lines coupled to respective columns of pixels in pixel array 20. Path 72 may be coupled to analog circuitry 56, which includes readout circuitry. Path 74 may connect digital circuitry 58 to analog circuitry 56. Analog-to-digital conversion circuitry may be interposed between the analog circuitry and the digital circuitry. Digital circuitry may include one or more output lines that provide digital image data to downstream processing circuitry. As an example, digital circuitry 58 may output processed digital signals to storage and processing circuitry 18 in FIG. 1 via an output line.

Figure 5A:
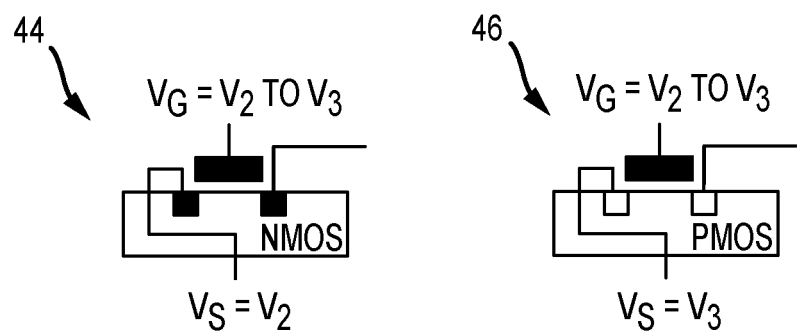
FIGS. 5A and 5B are diagrams of illustrative low-voltage transistors within analog circuitry and digital circuitry in an image sensor of the type shown in FIG. 4 in accordance with an embodiment.
Figure 5B:
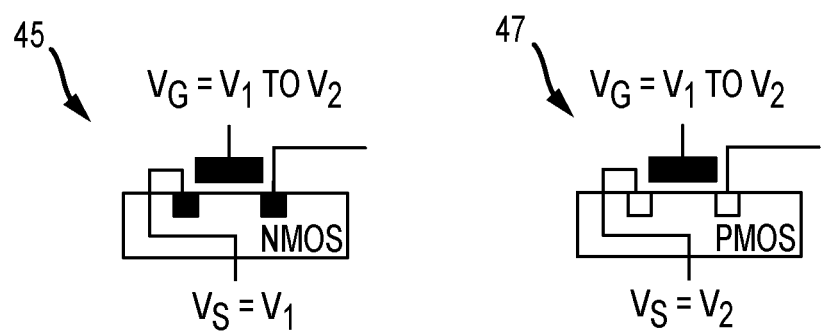

As described above, circuits in analog circuitry 56 may receive an upper voltage level (e.g., voltage level $V_3$) and a lower voltage level (e.g., voltage level $V_2$). As such, analog circuitry 56 may include and operate using low-voltage transistor structures, which are configured to receive signals between voltage levels $V_2$ and $V_3$. In particular, each of the terminals of a given low-voltage transistor (e.g., a first source-drain terminal, a second source-drain terminal, a body bias terminal, a gate terminal, etc.) may receive a signal that has only voltages between voltage levels $V_2$ and $V_3$. Similarly, digital circuitry 58 may receive an upper voltage level (e.g., voltage level $V_2$) and a lower voltage level (e.g., voltage level $V_1$), and include and operate using low-voltage transistors structures. Each of the terminals of a given low-voltage transistor in digital circuitry 58 may receive a signal that has voltages between voltage levels $V_1$ and $V_2$. FIGS. 5A and 5B show illustrative transistors that may be used for analog and digital circuitry in an image sensor of the type shown in FIG. 4.

In particular, FIG. 5A shows illustrative transistors, NMOS transistor 44 and PMOS transistor 46, which analog circuitry 56 in FIG. 4 may include. Transistor 44 may have a first source-drain terminal, a second source-drain terminal, a gate terminal, and a body terminal. As examples, the first source-drain terminal (e.g., a source terminal) of transistor 44 may be electrically connected (i.e., shorted) to rail 52 in FIG. 4 to provide the source terminal with a relatively low voltage (e.g., a voltage level $V_2$) that serves as a ground or reference voltage when operating transistor 44, even though rail 52 may provide an absolute voltage above 0V to transistor 44. The body terminal of transistor 44 may be shorted to the source terminal or electrically connected to rail 52. The gate terminal of transistor 44 may receive control signals having voltages between voltage levels $V_2$ and $V_3$. If desired, the gate terminal of transistor 44 may receive control signals having voltages that are well within the voltage range between voltage levels $V_2$ and $V_3$ to avoid any fringe effects associated with over-driving or under-driving transistor 44. For example, when $V_2$ and $V_3$ are configured to be 1.0V and 2.5V, the control signals received by gate terminal of transistor 44 may be between 1.2V and 2.3V. As another example, when $V_2$ and $V_3$ are configured to be 1.25V and 2.5V, the control signals received by gate terminal of transistor 44 may be between 1.4V and 2.3V. The second source-drain terminal (e.g., a drain terminal) of transistor 44 may receive any suitable voltage (e.g., 2.5V, 1.25V, 1.0V, a voltage less than 2.5V, a voltage greater than 1.25V, a voltage greater than 1.0V, a voltage between voltages $V_2$ and $V_3$, etc.) to operate transistor 44.

PMOS transistor 46 may similarly include first and second source-drain terminals, a gate terminal, and a body terminal. The first source-drain terminal of transistor 46 may be electrically connected to rail 54 (in FIG. 4), which provides voltage level $V_3$. The body terminal of transistor 46 may be shorted to the first source-drain terminal of transistor 46 and receive voltage level $V_3$. The gate terminal of transistor 46 may receive a control signal between voltage levels $V_1$ and $V_2$. The second source-drain terminal of transistor 46 may receive any suitable voltage (e.g., 2.5V, 1.25V, 1.0V, a voltage less than 2.5V, a voltage greater than 1.25V, a voltage greater than 1.0V, a voltage between voltages $V_2$ and $V_3$, etc.) to operate transistor 46.

FIG. 5B shows illustrative transistors, NMOS transistor 45 and PMOS transistor 47, which digital circuitry 58 in FIG. 4 may include. NMOS transistor 45 may have a first source-drain terminal that receives voltage level $V_1$ (e.g., via rail 50), a body terminal that receives voltage level $V_1$ (e.g., by shorting to the first source-drain terminal), a gate terminal that receives a control signal that has voltages between voltage levels $V_1$ and $V_2$, and a second source-drain terminal that receives a suitable voltage (e.g., 0V, 1.25V, 1.0V, a voltage greater than 0V, a voltage less than 1.25V, a voltage less than 1.0V, a voltage between voltages $V_1$ and $V_2$, etc.) to operate (e.g., drive) transistor 45. Similarly, PMOS transistor 47 may have a first source-drain terminal that receives voltage level $V_2$ (e.g., via rail 52), a body terminal that receives voltage level $V_2$ (e.g., by shorting to the first source-drain terminal), a gate terminal that receives a control signal that has voltages between voltage levels $V_1$ and $V_2$, and a second source-drain terminal that receives a suitable voltage (e.g., 0V, 1.25V, 1.0V, a voltage greater than 0V, a voltage less than 1.25V, a voltage less than 1.0V, a voltage between voltages $V_1$ and $V_2$, etc.) to operate (e.g., drive) transistor 47.

If desired, transistors in analog circuitry 56 and digital circuitry 58 may have transistors of the same type or size. For example, transistor 44 in analog circuitry 56 and transistor 45 in digital circuitry 58 may be the same type. Similarly, transistor 46 in analog circuitry 56 and transistor 47 in digital circuitry 58 may be the same type. Alternatively, the exemplary CMOS transistors of analog and digital circuitry may be of different types. Regardless, the size of transistors 44-47 may be scalable, as voltage level $V_2$ is adjustable to reduce the operating voltage swing of at least the analog transistors. The examples described in FIGS. 5A and 5B are merely illustrative. If desired, any type of transistors may be used in the analog and digital circuitry to suitably operate image sensor 16.

Figure 6:
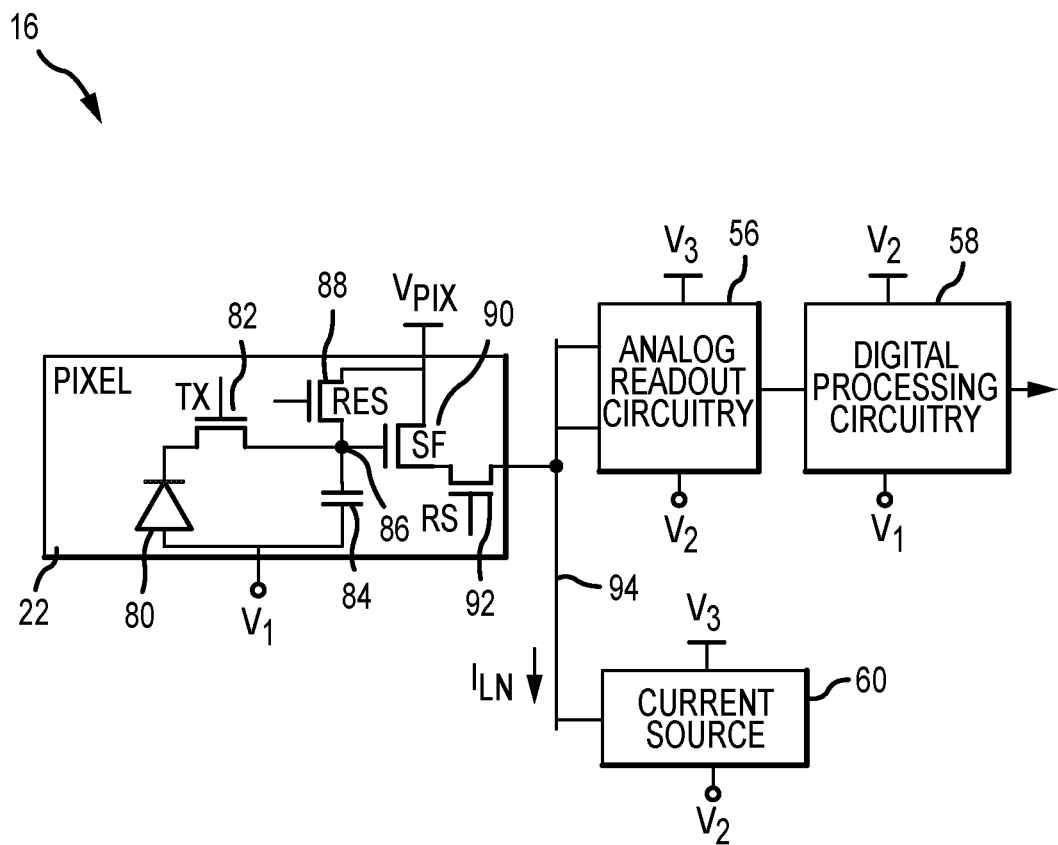
FIG. 6 is a block diagram of an illustrative pixel signal output path, along which analog circuitry and digital circuitry are coupled, in accordance with an embodiment.

FIG. 6 shows an illustrative pixel coupled to analog and digital circuitry through a pixel output line and an image data output path. As shown in FIG. 6, image sensor 16 may include an illustrative image sensor pixel 22. Pixel 22 may include photosensitive element/region 80 (e.g., a photodiode 80 pinned to a pinning voltage). As an example, photodiode 80 may be grounded at a first terminal (e.g., connected to voltage level $V_1$ or to 0V). Photodiode 80 may receive incident light over a period of time (e.g., exposure time) and generate an image signal corresponding to the incident light over the exposure time. Pixel 22 may also include transfer transistor 82, reset transistor 88, and source follower transistor 90. Pixel 22 may further include row select transistor 92 or any other desired transistors (e.g., gain control transistors, anti-blooming transistor, etc.) to enable additional capabilities.

Transfer transistor 82 may have a gate that is controlled by a transfer control signal TX. Transfer transistor 82 may couple photodiode 80 to floating diffusion region 86 having a capacitance represented by capacitor 84 (sometimes referred to herein as floating diffusion 86 or floating diffusion node 86) coupled between node 86 and voltage level $V_1$ (e.g., 0V). Floating diffusion region 54 may be a doped-semiconductor region (e.g., a doped silicon region formed in a silicon substrate by ion implantation, impurity diffusion, or other doping techniques) that has a charge storage capability (e.g., capacitor 84).

When transfer control signal TX is asserted, the image signal generated at photodiode 80 may be transferred to floating diffusion region 86. Reset transistor 88 may have a gate that is controlled by a reset control signal RES. Reset transistor 88 may couple a voltage supply providing a reset voltage level (e.g., a pixel voltage level $V_{PIX}$) to floating diffusion 86. Prior to asserting control signal TX, the voltage at floating diffusion region 86 may be reset to reset voltage level $V_{PIX}$ by asserting reset control signal RES. If desired, reset control signal RES may also be asserted at another time to reset the voltage at floating diffusion region 86. Source follower transistor 90 may have a gate terminal coupled to floating diffusion region 86. Source follower transistor 90 may conductively couple power supply circuitry 48, which provides pixel voltage $V_{PIX}$, to pixel output line 94. During readout operations, output line 94 may provide an analog image signal to analog readout circuitry 56 external to array 20. The analog image signal on output line 94 may correspond to an image signal voltage level at floating diffusion region 86, which may correspond to an image signal generated at photodiode 80. If desired, output line 94 may also provide a reset level signal (e.g., a signal that correspond to image voltage level $V_{PIX}$) to analog readout circuitry 56. The reset level signal may correspond to a reset voltage level signal stored at floating diffusion region 86. If desired, pixel 22 may also include any other structures that are suitable for the operation of pixel 22.

Image sensor 16 may include current source 60, which is configured to generate (e.g., provide) a current ILN on pixel output line 94 using voltage levels $V_2$ and $V_3$ provided from power supply circuitry 48. Current LLN may drive an image signal (or a reset level signal) from pixel 22 onto pixel output line 94 and into analog readout circuitry 56. To generate a suitable current ILN, voltage level $V_2$ may be selected to be lower than a minimum voltage level on pixel output line 94 by a voltage tolerance (e.g., 0.3V or any suitable voltage difference). Analog readout circuitry 56, which operates between voltage levels $V_2$ and $V_3$, may first receive and process (e.g., modify) the image and reset level signals. In other words, the image and reset level signals may be provided to a first analog voltage level domain (e.g., a voltage level between $V_2$ and $V_3$ in analog circuitry 56). Conversion circuitry may generate digital image data based on the image and reset level analog signals before transferring the digital image data to digital processing circuitry 58, which operates between voltage levels $V_1$ and $V_2$. In other words, a voltage down converting circuit may convert the image and reset level signals between voltage levels $V_2$ and $V_3$ to image data between voltage levels $V_1$ and $V_2$ before providing the image data to digital processing circuitry 58 in a second voltage level domain (e.g., a voltage level between $V_1$ and $V_2$ in digital circuitry 58).

Figure 7:
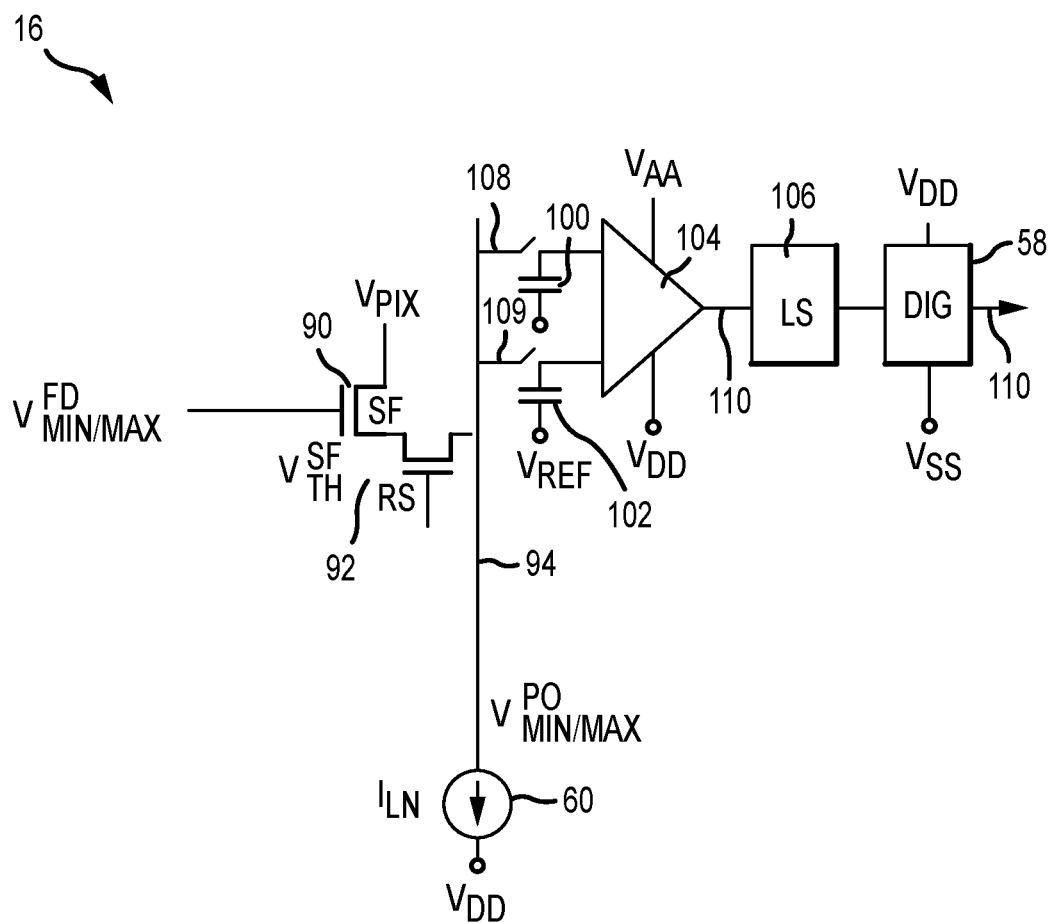
FIG. 7 is a circuit diagram of an illustrative pixel signal output path, along which analog circuitry and digital circuitry are coupled, in accordance with an embodiment.

FIG. 7 shows a circuit diagram with illustrative voltages assigned to circuitry coupled along an image output path. FIG. 7 includes similar circuit components as those previously shown and described in connection with FIG. 6. Some of these components (e.g., photodiode 80, transistors transistor 82, etc.) are omitted from FIG. 7 in order to not unnecessarily obscure the present drawing. Descriptions of features analogous to those previously described in connection with FIG. 6 are also omitted from the description of FIG. 7 to not obscure the present invention.

As shown in FIG. 7, source follower transistor 90 may have a gate terminal coupled to a floating diffusion voltage signal that has voltages between a minimum voltage $V_{MIN}$ and a maximum voltage $V_{MAX}$. Transistor 90 may have first source drain terminal may be coupled to pixel voltage $V_{PIX}$ that is used to amplify the floating diffusion voltage signal based on a threshold voltage $V_{TH}$ of transistor 90. Transistor 90 may be coupled to row select transistor 92 at a second source-drain terminal of transistor 90. The amplified floating diffusion voltage signal may be passed to pixel output line 94. The image and reset signals on pixel output line 94 may have voltages between a minimum voltage $V_{MIN}$ and $V_{MAX}$, which correspond to the minimum and maximum voltages of the floating diffusion voltage signal (e.g., is proportional to or scaled with respect to the minimum and maximum voltages of the floating diffusion voltage signal). As an example, the floating diffusion voltage signal may be between 2.1V and 2.8V, the threshold voltage of transistor 90 may be 0.55V, and the image or reset signal on pixel output line 94 may be 1.55V and 2.25V (e.g., the threshold voltage of transistor 90 subtracted from the floating diffusion region signal voltage).

Pixel output line 94 may be coupled to readout circuitry via paths 108 and 109. Path 108 may be used to sample and hold a reset level signal (e.g., a $V_{PIX}$ level signal) using capacitor 100 and a corresponding switch that stores the sampled signal at capacitor 100. A first terminal of capacitor 100 may be coupled to path 108, and a second terminal of capacitor 100 may be coupled to reference voltage $V_{REF}$. Path 109 may be used to sample and hold an image signal (e.g., signals generated by photodiode 80 and transferred to pixel output line 94) using capacitor 102 and a corresponding switch that stores the sampled signal at capacitor 102. Similarly, a first terminal of capacitor 102 may be coupled to path 109, and a second terminal of capacitor 102 may be coupled to reference voltage $V_{REF}$. Reference voltage $V_{REF}$ may be selected to accurately read the image and reset level signals on pixel output line 94. As an example, voltage level $V_{REF}$ may be at the same voltage level as $V_2$. However, the signal received at the second terminals of capacitors 100 and 102 are required to be highly accurate signals with low voltage variation (e.g., a signal with a less than 50% least significant bit voltage variation from voltage level $V_{REF}$).

Comparator circuitry 104 may be coupled to capacitors 100 and 102 (e.g., sample and hold circuitry) and receive a reset level signal at a first terminal and an image level signal at a second terminal. Comparator circuitry 104 may operate using high voltage level $V_{AA}$ (e.g., an analog circuitry supply voltage) and low voltage level $V_{DD}$ (e.g., a digital circuitry supply voltage). High voltage level $V_{AA}$ and low voltage level $V_{DD}$ correspond to voltage levels $V_3$ and $V_2$ as previously described, respectively. Comparator circuitry 104 may generate a binary signal based on a comparison of input signals received at the first and second input terminals of comparator circuitry 104. Comparator circuitry may include one or more comparator circuits, additional reference voltage signals, operational amplifiers, capacitors, transistors, and any other suitable circuitry. Storage circuitry 106 may receive the generated binary signal and generate corresponding digital image data. Storage circuitry 106 may include latching circuitry, registers, clock signals, or any other suitable components. Digital circuitry 58, which operates between voltage levels $V_{DD}$ (e.g., a digital circuitry supply voltage) and $V_{ss}$ (e.g., a ground voltage, 0V), may receive the generated digital image data and perform subsequent processing, as desired. Digital circuitry 58 generate processed digital image data on path 110 for storage or further processing.

Figure 8:
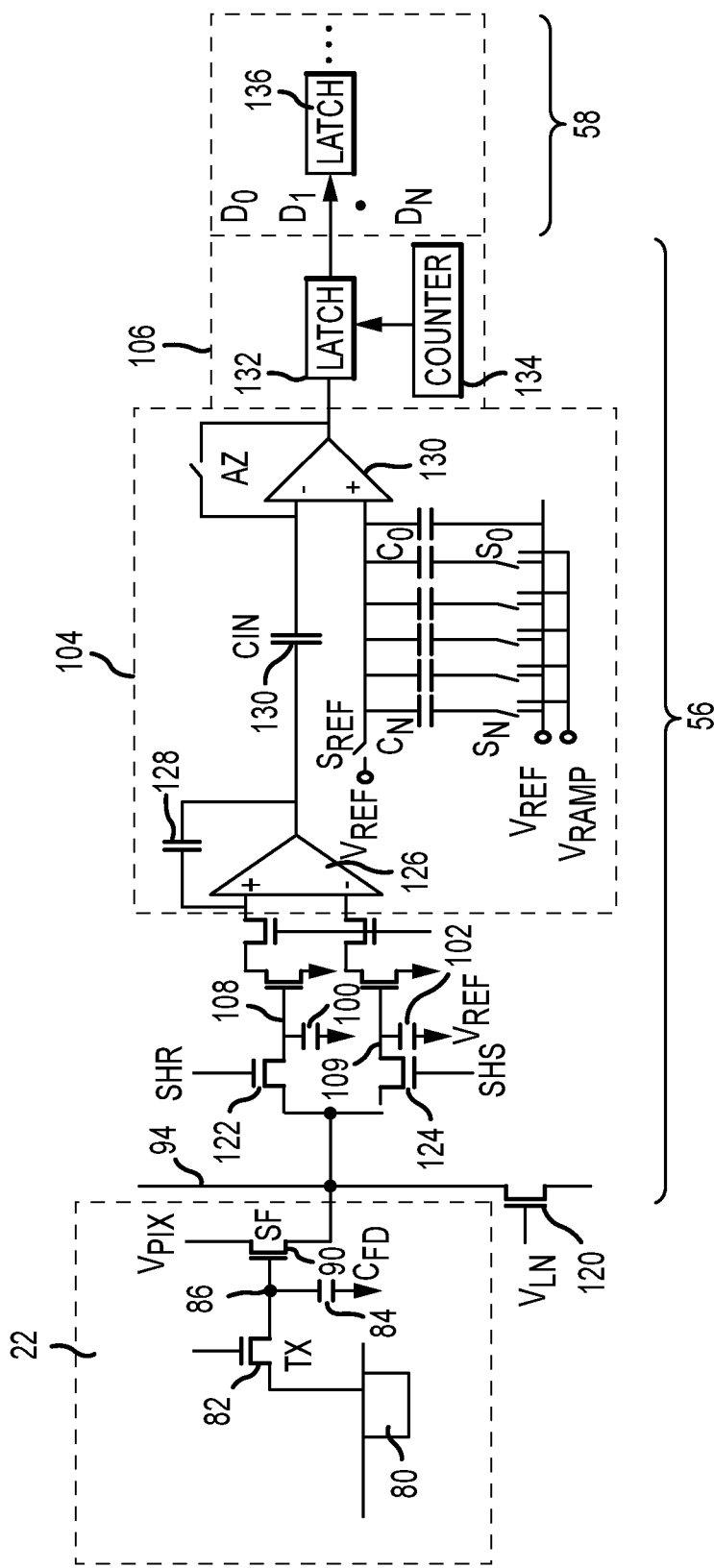
FIG. 8 is a circuit diagram of an illustrative pixel signal output path having different voltage domains in accordance with an embodiment.

FIG. 8 shows a more detailed image data output path coupled to pixel 22. Descriptions of features analogous to those previously described in connection with FIGS. 6 and 7 (and any other drawings) are omitted from the description of FIG. 8 in order to not unnecessarily obscure the present invention. These features (e.g., structures within pixel 22, capacitors 100 and 102, etc.) may have similar functions and structures as previously described in connection with a previous figure.

As shown in FIG. 8, pixel output line 94 may be coupled to transistor 120 configured to electrically connect a current source to pixel output line 94 when transistors 120 is conductive (e.g., when control signal $V_{LN}$ is asserted). In other words, pixel output line 94 may be coupled to a first source-drain terminal of transistor 120, while current source 60 (not shown in FIG. 8) may be coupled to a second source-drain terminal of transistor 120. As previously described, the pixel readout circuitry may include sample and hold circuitry. In particular, sample and hold circuitry may include transistors 122 and 124. Transistor 122 may electrically connect pixel output line 94 to capacitor 100 when control signal SHR is asserted to selectively sample a reset level signal on output line 94. Transistor 124 may electrically connect pixel output line 94 to capacitor 102 when control signal SHS is asserted to selectively sample an image signal on output line 94. Transistors 122 and 124 may be selectively deasserted to hold a respective signal at capacitors 100 and 102, respectively. Capacitors 100 and 102 may be respectively coupled to first (positive) and second (negative) terminals of comparator circuit 126 (e.g., differential amplifier 126), respectively (e.g., each via two interposing transistors). Capacitor 128 may couple the positive terminal of comparator circuit 126 to an output terminal of comparator circuit 126. Comparator circuit 126 may generate an analog image signal based on the difference between the two inputs of comparator circuit 126.

The output terminal of comparator circuit 126 may be coupled to a first (negative) input terminal of comparator circuit 130 via capacitor 132, which holds the analog image signal generated by comparator circuit 126. The analog image signal is compared with a reference voltage generated using a set of capacitors having different capacitances coupled in parallel to a second (positive) input terminal of comparator circuit 130. Each capacitor may be coupled a switch that selectively couples a given capacitor to the second input terminal of comparator circuit 130. Comparator circuit 130 may compare the analog image signal and a set of reference voltages to generate a comparison output. An auto-zero switch may couple the first input terminal to the output terminal of comparator circuit 130. Latching circuit 132 may receive the comparison output generated by comparator 130 and generate corresponding digital image data based on an input from counter 134 and the comparison output. Additional latching circuitry 136 and additional digital circuits in digital circuitry 58 may receive the digital image data and perform digital processing on the digital image data.

Analog circuitry 56 may include current source circuitry (e.g., current source 60, transistor 120), sample and hold circuitry (e.g., transistors 122 and 124), comparator circuitry 104, and latching circuitry 106. Each circuit in analog circuitry 56 may operate based on voltages between voltage levels $V_2$ (e.g., $V_{REF}$) and $V_3$. In other words, the circuits within analog portion 56 operate within a voltage level domain between voltage levels $V_2$ and $V_3$. In such a configuration, analog circuitry 56 can interface well with the pixel output (e.g., image and reset signals on output line 94 which have voltage levels between levels $V_2$ and $V_3$. Digital circuitry 58 may be downstream from analog circuitry 56. Each circuit in digital circuitry 58 may operate based on voltages between voltage levels $V_1$ (e.g., 0V) and $V_2$. In other words, the circuits within digital portion 58 operate within a voltage level domain between voltage levels $V_1$ and $V_2$.

In the configuration described above, analog portion 56 and digital portions 58 may operate in different voltage level domains. If desired, reference voltage $V_{REF}$ provided to capacitors 100 and 102 may be changed after sampling an image signals to down-convert the voltage level domain of the image signal. In particular, after sampling image and reset level signals using transistors 124 and 122 and a first reference voltage (e.g., $V_{REF}$) provided to capacitors 102 and 100, respectively, transistors 124 and 122 may be deactivated (e.g., be turned off, become non-conductive). The first reference voltage may be shifted to a second (lower) voltage level (e.g., from voltage level $V_2$, equivalent to $V_{REF}$, to voltage level $V_1$). The image and reset level signals stored at capacitors 102 and 100 will also shift proportionally to the voltage shift in the reference voltage level. Transistors interposed between capacitors 100 and 102, and comparator circuit 126 may be non-conductive during this voltage level shift. After the voltage level shift, any downstream circuitry (whether analog or digital) may include circuitry (e.g., transistors) configured to operate in the shift voltage domain (e.g., between voltage levels $V_1$ and $V_2$).

The configuration of power supply circuitry 48 providing power rails 50, 52, and 54 to analog circuitry 56 and analog circuitry 58 (as shown in described in connections with FIGS. 4-8) is merely illustrative. If desired, power supply circuitry 48 may provide any number of power rails providing any number of voltage levels to different portions of circuitry in image sensor 16.

As an example, power supply circuitry 48 may include additional power rails respectively providing additional intermediate voltage levels (e.g., voltage levels $V_4$, $V_5$, $V_6$, etc., between voltage levels $V_1$ and $V_3$) to different portions of analog circuitry 56, analog circuitry 58, and other circuitry within image sensor 16. In other words, voltage levels in descending voltage level order may be $V_3$, $V_4$, $V_2$, and $V_1$. In particular, a first portion of analog circuitry 56 may operate in a voltage level domain between voltage levels $V_3$ and $V_4$, a second portion of analog circuitry 56 may operate in a voltage level domain between voltage levels $V_4$ and $V_2$, and digital circuitry 58 may operate in a voltage level domain between voltage levels $V_2$ and $V_1$. In this configuration, the transistor size required within each voltage level domain may be further reduced because the maximum voltage difference in each voltage level domain is reduced. Similar configurations may be implemented with more than three intermediate rails each providing a respective intermediate voltage level. Analogously other circuitry (e.g., digital circuitry) may also be configured to have circuitry that operates in multiple voltage level domains.

An exemplary three voltage level domain configuration may be having a first voltage level domain from 0V to 0.9V, a second voltage level domain from 0.9V to 1.8V, and a third voltage level domain from 1.8V to 2.7V. Transistors tolerant of 1.0V voltage differences may be used in all three domains. A pixel voltage of 2.8V may be considered to be included in the third voltage level domain. As such, the digital processing circuitry may operate in the first voltage level domain to reduce power consumption.

Furthermore, image sensor 16 may be a mixed-signal CMOS image sensor that includes both analog signal circuitry and digital analog signal circuitry. If desired, image sensor 16 may include portions formed on different dies coupled to each other vertically (e.g., image sensor 16 may be formed in a stacked die configuration). As an example, a first integrated circuit die may include image sensor array 20, a second integrated circuit die may include analog circuitry 56, and a third integrated circuit die may include digital circuitry 58. Alternatively, analog and digital circuitry may be formed on the same die, while array 20 may be formed on a separated die. Additionally, the configurations described in connection with FIGS. 4-8 may enable readout circuitry to perform readout operation using p-channel readouts.

Figure 9:
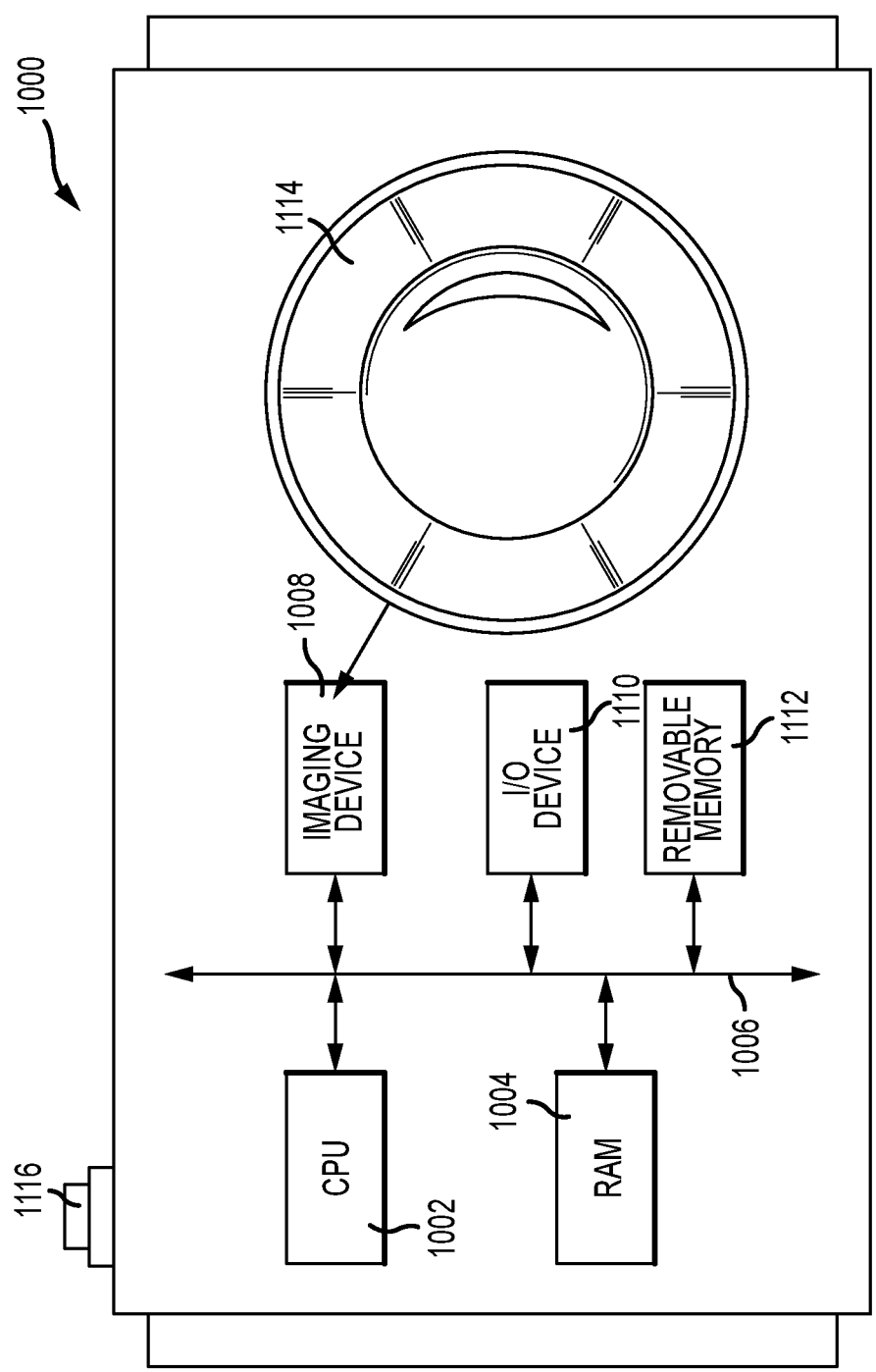
FIG. 9 is a block diagram of an illustrative processor system that may employ some of the embodiments of FIGS. 1-8 in accordance with an embodiment.

FIG. 9 is a simplified diagram of an illustrative processor system 1000, such as a digital camera, which includes an imaging device 1008 (e.g., the camera module of FIG. 1) employing low-voltage transistors, power rails structures, analog circuitry, digital circuitry, etc., as described above in connection with FIGS. 1-8. Without being limiting, such a system could include a computer system, still or video camera system, scanner, machine vision system, vehicle navigation system, video phone, surveillance system, auto focus system, star tracker system, motion detection system, image stabilization system, and other systems employing an imaging device.

Processor system 1000, for example a digital still or video camera system, generally includes a lens 1114 for focusing an image onto one or more pixel array in imaging device 1008 when a shutter release button 1116 is pressed and a central processing unit (CPU) 1002 such as a microprocessor which controls camera and one or more image flow functions. Processing unit 1102 can communicate with one or more input-output (I/O) devices 1110 over a system bus 1006. Imaging device 1008 may also communicate with CPU 1002 over bus 1006. System 1000 may also include random access memory (RAM) 1004 and can optionally include removable memory 1112, such as flash memory, which can also communicate with CPU 1002 over the bus 1006. Imaging device 1008 may be combined with the CPU, with or without memory storage on a single integrated circuit or on a different chip. Although bus 1006 is illustrated as a single bus, it may be one or more busses, bridges or other communication paths used to interconnect system components of system 1000.

Various embodiments have been described illustrating systems and methods for low-voltage transistors in analog and digital circuitry.

In one embodiment, an image sensor may include an array of image pixels having at least one active pixel. The active image pixel may be configured to generate an analog image signal in response to incident light. The image pixel may be coupled to analog readout circuitry via a pixel output line. The image sensor may include a current source configured to generate a current on the pixel output line while receiving voltages the first and second voltage levels. The readout circuitry may be configured to operate in a first voltage domain defined by a first set of voltages between a first (high) voltage level, a second (intermediate) voltage level (e.g., analog readout circuitry may be configured to operate using the first set of voltages). The readout circuitry may be coupled to digital processing circuitry via an image output path. The processing circuitry may be configured to operate in a second voltage domain defined by a second set of voltages between the second (intermediate) voltage level and a third (low) voltage level (e.g., digital processing circuitry may be configured to operate using the second set of voltages). The readout circuitry may include sample and hold circuitry that is configured to receive a reference voltage that is at a same voltage as the second voltage level.

The readout circuitry may include transistors that receive only signals having voltages between the first and second voltage levels, and the transistors (e.g., NMOS transistors or PMOS transistors) in the readout circuitry may have respective body terminals and source terminals that are biased to one of the first (high) and second (intermediate) voltage levels. The processing circuitry may include transistors that receive only signals having voltages between the second and the third voltage levels, and the transistors (e.g., NMOS or PMOS transistors) in the processing circuitry may have respective body terminals and source terminals that are biased to one of the first (low) or second (intermediate) voltage levels.

The image sensor may include power supply circuitry configured to provide the first (high) voltage level to the readout circuitry via a first power rail, the second (intermediate) voltage level to the readout circuitry via a second power rail, the third (low) voltage level to the processing circuitry via a third power rail, and the second (intermediate) voltage level to the processing circuitry via the second power rail. As an example, the third low voltage level may be a ground voltage and the second intermediate voltage level may be at a voltage between those of the first and third voltage levels.

The image sensor may be included in an imaging system, which includes a central processing unit, memory, and one or more lenses.

The foregoing is merely illustrative of the principles of this invention and various modifications can be made by those skilled in the art without departing from the scope and spirit of the invention. The foregoing embodiments may be implemented individually or in any combination.

What is claimed is:

1. An image sensor, comprising:
    an image pixel configured to generate an analog image signal in response to incident light;
    readout circuitry coupled to the image pixel via a pixel output line;
    processing circuitry coupled to the readout circuitry via an image output path; and
    power supply circuitry coupled to the readout circuitry using a first power rail and a second power rail, and coupled to the processing circuitry using the second power rail and a third power rail, wherein the first power rail supplies a first voltage level, the second power rail supplies a second voltage level that is at a lower voltage than the first voltage level, the third power rail supplies a third voltage level that is at a lower voltage than the second voltage level.

2. The image sensor defined in claim 1, wherein the readout circuitry comprises transistors that receive only signals having voltages between the first voltage level and the second voltage level.

3. The image sensor defined in claim 2, wherein the transistors in the readout circuitry have respective substrate body terminals, each biased to one of the first and second voltage levels.

4. The image sensor defined in claim 3, wherein the processing circuitry comprises transistors that receive only signals having voltages between the second voltage level and the third voltage level.

5. The image sensor defined in claim 4, wherein the transistors in the processing circuitry have respective substrate body terminals, each biased to one of the second and third voltage levels.

6. The image sensor defined in claim 1, wherein the readout circuitry comprises analog circuitry and is configured to receive the analog image signal and convert the analog image signal into digital image data.

7. The image sensor defined in claim 6, wherein the processing circuitry comprises digital circuitry and is configured to receive the digital image data from the readout circuitry.

8. The image sensor defined in claim 7, wherein the readout circuitry comprises sample and hold circuitry and the sample and hold circuitry is configured to receive a reference voltage that is at a same voltage as the second voltage level.

9. The image sensor defined in claim 1, wherein the third voltage level is a grounding voltage level.

10. The image sensor defined in claim 1, wherein the readout circuitry is operable in a first voltage domain defined by the first and second voltage levels, and the processing circuitry is operable in a second voltage domain defined by the second and third voltage levels.

11. Image sensor circuitry, comprising:
    an image pixel configured to generate an analog image signal in response to incident light;
    analog circuitry having a first transistor configured to operate using a first set of voltages between a first voltage level and a second voltage level, wherein the first transistor includes a body terminal that is biased to the second voltage level; and
    digital circuitry having a second transistor configured to operate using a second set of voltages between the second voltage level and a third voltage level, wherein the second transistor includes a body terminal that is biased to the third voltage level.

12. The image sensor circuitry defined in claim 11, wherein the third voltage level is at a ground voltage and the second voltage level is at a voltage higher than the ground voltage.

13. The image sensor circuitry defined in claim 11, wherein the third voltage level is at a voltage higher than the voltage of the second voltage level.

14. The image sensor circuitry defined in claim 11, wherein the analog circuitry is interposed between the image pixel and the digital circuitry.

15. The image sensor circuitry defined in claim 14, further comprising:
    a current source configured to generate a current on a pixel output line while receiving the first voltage level and the second voltage level, wherein the pixel output line couples the image pixel to the analog circuitry.

16. An imaging system, comprising:
    at least one lens;

an array of image sensor pixels, wherein the at least one lens focuses image light onto the array of image sensor pixels and wherein the image sensor pixels are configured to generate analog image signals in response to the image light;

readout circuitry coupled to the array of image sensor pixels and configured to operate in a first voltage level domain, wherein the first voltage level domain includes an intermediate voltage level that defines a minimum voltage level in the first voltage level domain; and processing circuitry coupled to the readout circuitry and configured to operate in a second voltage level domain, wherein the second voltage level domain includes the intermediate voltage level that defines a maximum voltage level in the second voltage level domain.

17. The imaging system defined in claim 16, further comprising:

a first power supply rail configured to provide a first voltage level to the readout circuitry; and a second power supply rail configured to provide a second voltage level to the readout circuitry, wherein the first voltage level domain is defined by voltages between the first and second voltage levels and the second voltage level comprises the intermediate voltage level.

18. The imaging system defined in claim 17, further comprising:

a third power supply rail configured to provide a third voltage level to the processing circuitry, wherein the second power supply rail is configured to provide the second voltage level to the processing circuitry and the second voltage level domain is defined by voltages between the second and third voltage levels.

19. The imaging system defined in claim 18, wherein the third voltage level comprises a ground voltage level and the second voltage level comprises a voltage level above the ground voltage level.

* * * * *